(12) United States Patent
Lohr et al.

(10) Patent No.: US 6,227,123 B1
(45) Date of Patent: May 8, 2001

(54) RAILROAD CAR PICK-UP SHOE

(75) Inventors: David A. Lohr, Summerset, PA (US); Fred J. Taylor, Florence, KY (US); William E. Kurtz; Robert H. Dorian, both of Johnstown, PA (US)

(73) Assignee: Johnstown America Corporation, Chicago, IL (US)

( * ) Notice: Subject to any disclaimer, the term of this patent is extended or adjusted under 35 U.S.C. 154(b) by 0 days.

(21) Appl. No.: 09/268,813

(22) Filed: Mar. 16, 1999

Related U.S. Application Data

(60) Provisional application No. 60/078,143, filed on Mar. 16, 1998.

(51) Int. Cl.⁷ .................................................... B61D 7/30
(52) U.S. Cl. .................. 105/241.2; 105/239; 105/241.1; 191/45
(58) Field of Search ................... 191/45, 49, 47; 105/239, 241.2, 241.1

(56) References Cited

U.S. PATENT DOCUMENTS

| | | |
|---|---|---|
| 1,342,591 | 6/1920 | McNicholas . |
| 1,391,255 | 9/1921 | Keeling . |
| 1,391,502 | 9/1921 | Quarles . |
| 1,504,969 | 8/1924 | Parker . |
| 1,670,003 | 5/1928 | Pifer . |
| 1,771,718 | 7/1930 | McAvoy . |
| 1,802,322 | 4/1931 | Wilson . |
| 2,305,241 | 12/1942 | Duncan ................................ 105/286 |
| 3,509,292 * | 4/1970 | Dehn ...................................... 191/49 |
| 3,707,627 | 12/1972 | Sheppard ............................. 246/192 |
| 3,740,498 * | 6/1973 | Herbert ................................. 191/49 |
| 4,542,701 | 9/1985 | Fischer et al. ...................... 105/240 |
| 4,628,825 * | 12/1986 | Taylor et al. ........................ 105/289 |
| 5,454,456 * | 10/1995 | McKenzie .............................. 191/49 |

\* cited by examiner

*Primary Examiner*—S. Joseph Morano
*Assistant Examiner*—Frantz F. Jules
(74) *Attorney, Agent, or Firm*—Webb Ziesenheim Logsdon Orkin & Hanson, P.C.

(57) ABSTRACT

A wayside electrical pick-up shoe for operating the discharge, or the like, of a railcar includes a spring biased electrical contact pivotally attached to a base plate with a mechanism for electrically insulating the base plate from the electrical contact. The mechanism for electrically insulating the contact may include insulating material forming at least part of the pivot between the contact and the base plate. The mechanism for electrically insulating the contact may further include insulating material supplied on a spring member which biases the contact.

18 Claims, 8 Drawing Sheets

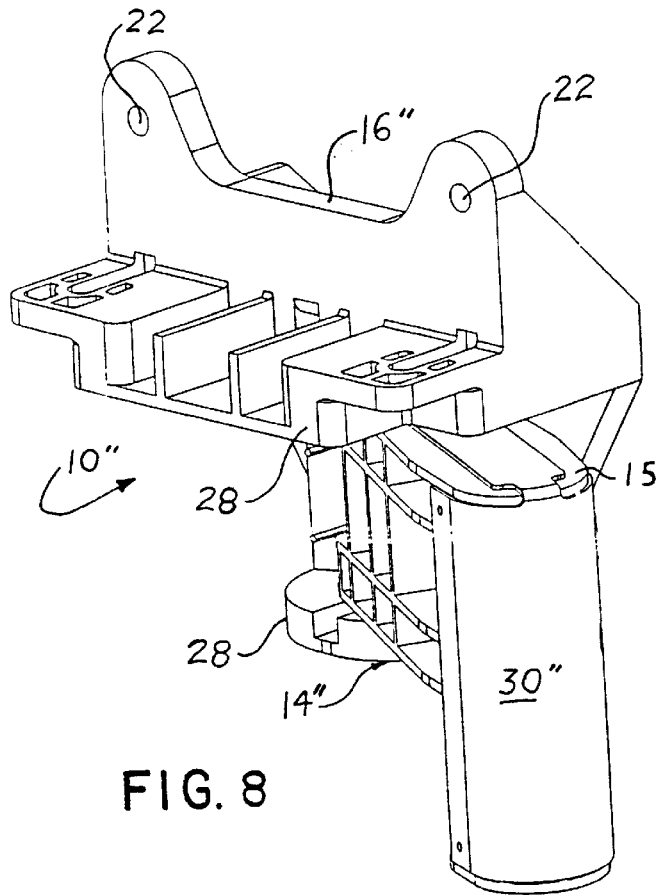
FIG. 8
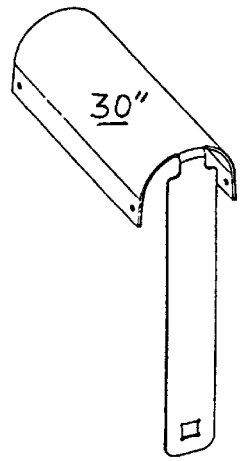
FIG. 11
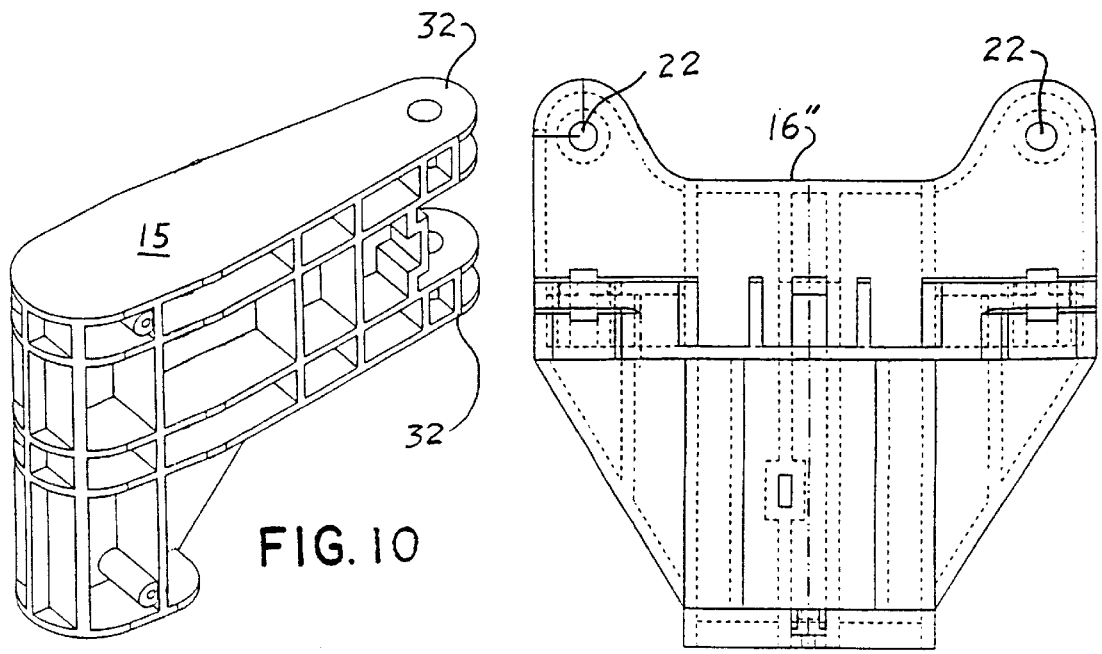
FIG. 10
FIG. 9

RAILROAD CAR PICK-UP SHOE

This application claims the benefit of U.S. patent application Ser. No. 60/078,143, filed Mar. 16, 1998 entitled "Insulated Pick-Up Shoe" which is incorporated herein by reference.

BACKGROUND OF THE INVENTION

1. Field of the Invention

We, David A. Lohr, William E. Kurtz, Robert H. Dorian and Fred J. Taylor have developed this invention which relates, in general, to electrical actuators for railroad cars and, more specifically, to a wayside electrical pick-up shoe for controlling a discharge of a bottom discharge railcar.

2. Prior Art

Externally activated electrical and mechanical actuators have long been utilized in railcars for actuating a variety of railcar components. For example, U.S. Pat. No. 1,391,255 discloses an automatic train stopping mechanism utilizing spring biased contact shoes on the railcar acting against ramp rails along the track. U.S. Pat. No. 1,504,969 also discloses a ramp shoe for a train stopping mechanism. U.S. Pat. No. 1,802,322 discloses an electrical railcar mounted actuator for operating signal lights. U.S. Pat. No. 1,342,591 discloses a street railcar mounted actuator for displaying next stop for the streetcar. Additionally, U.S. Pat. Nos. 2,305,241 and 4,542,701 disclose railcar mounted actuators, or pick-up shoes, for operating discharge doors of the railcar.

Pick-up shoes for railcars have been constructed of spring biased contacts attached to a base plate which is attached to the railcar. In existing pick-up shoes of this type, it is common for the base plate to be attached to the railcar through special insulated connectors. These insulating connectors tend to deteriorate and need frequent replacement. Additionally, these insulating connectors require specially sized mounting holes. All of these factors increase the cost of existing pick-up shoes as well as the time for installing and maintaining the pick-up shoes.

It is an object of the present invention to overcome the drawbacks of the prior art. It is another object of the present invention to provide a pick-up shoe which can be attached to the railcar using conventional attachments, such as bolts. A further object of the present invention is to provide a lightweight pick-up shoe. It is a further object of the present invention to provide a pick-up shoe which has a longer, useful life span than the prior art.

SUMMARY OF THE INVENTION

The above objects are achieved with a wayside electrical pick-up shoe according to the present invention. The pick-up shoe includes a spring biased electrical contact pivotally attached to a base plate and a mechanism for electrically insulating the base plate from the electrical contact. In one embodiment of the present invention, the mechanism for electrically insulating the contact includes insulating material forming at least part of the pivot between the contact and the base plate, such as a pivot pin formed of insulating material. The mechanism for electrically insulating the contact may further include additional insulation plates on the body and/or the electrical contact or insulating material may be supplied on a spring member which biases the contact.

In one embodiment of the present invention, the base plate is formed from a non-conductive material such as a plastic or composite material. In this embodiment, the material of the base plate itself serves as the mechanism for electrically insulating the contact from the base plate. In this embodiment, the electrical contact may be formed entirely of an electrically conductive material, or alternatively, the electrical contact may include a replaceable, electrically conductive plate.

The wayside electrical pick-up shoe according to the present invention may be used for operating the discharge mechanism for the railcar or any electrically activated system on a railcar. Additionally, the wayside electrical pick-up shoe according to the present invention allows the base plate to be attached to the railcar by conventional connectors, such as bolts, because the present design avoids the need for electrical insulation between the base plate and the railcar body. The present invention incorporates the insulation into areas having less stress than the prior art resulting in an increase in the expected life span of the pick-up shoe. All of these advantages are provided without detrimentally affecting the location or the operation of the pick-up shoe.

These and other advantages of the present invention will be clarified in the brief description of the preferred embodiments taken together with the attached figures wherein like references represent like elements throughout.

BRIEF DESCRIPTION OF THE DRAWINGS

FIG. 8 is a perspective view of a wayside electrical pick-up shoe according to a third embodiment of the present invention;

FIG. 9 is a plan view of a base plate for the wayside electrical pick-up shoe illustrated in FIG. 8;

FIG. 10 is a perspective view of a molded portion of an electrical contact of the wayside electrical pick-up shoe illustrated in FIG. 8; and FIG. 11 is a perspective view of a contact face plate of the electrical contact of the wayside electrical pick-up shoe illustrated in FIG. 8.

DESCRIPTION OF THE PREFERRED EMBODIMENTS

Figure 1:
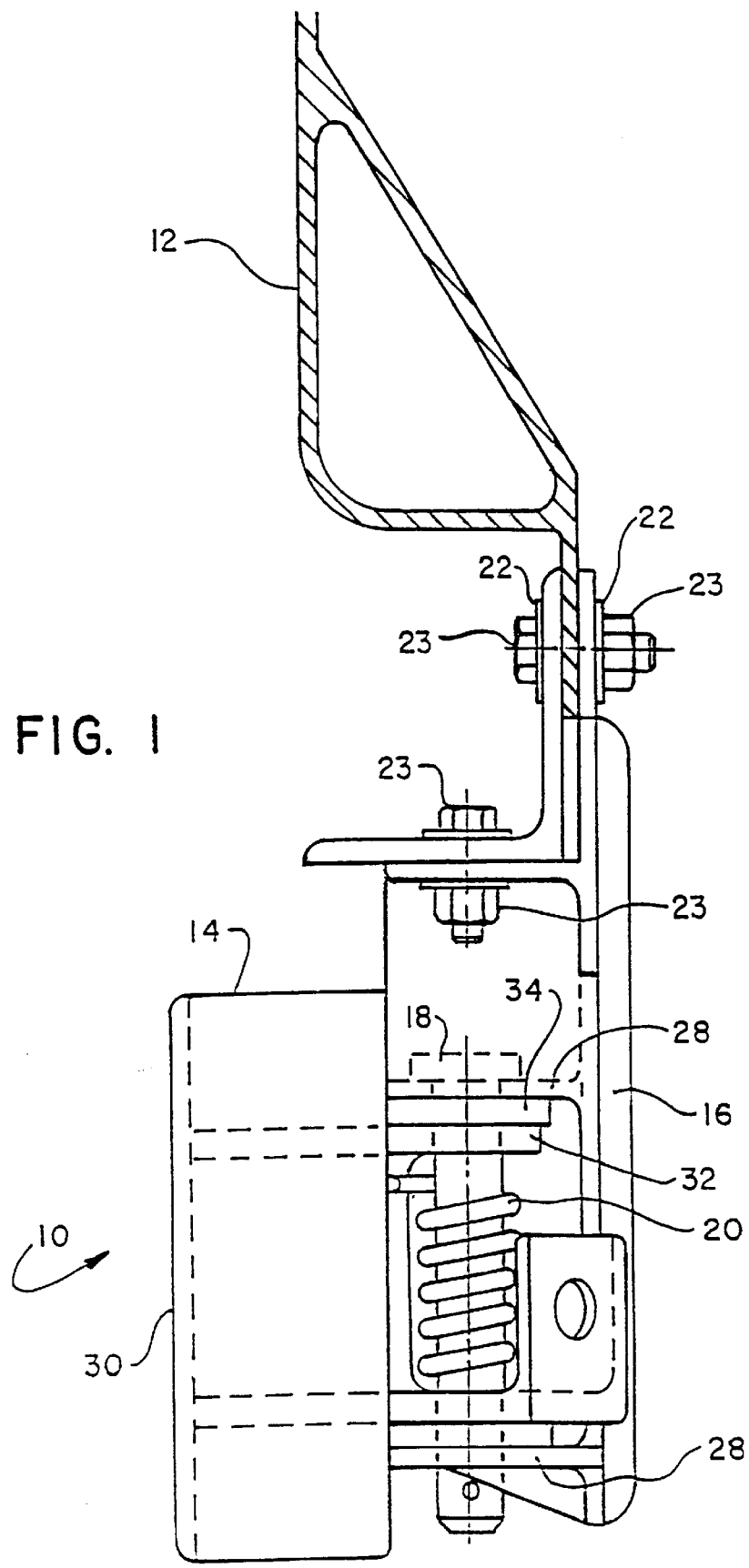
FIG. 1 is an end view of a wayside electrical pick-up shoe according to a first embodiment of the present invention with the pick-up shoe attached to a railcar which is illustrated in section.

A wayside electrical pick-up shoe 10 according to a first embodiment of the present invention is illustrated in FIGS. 1–5. The pick-up shoe 10 may be attached to a body 12 of a railcar as shown in FIG. 1 and used for operating the discharge (not shown), or the like, of a railcar in a conventional fashion. The pick-up shoe 10 can be used to operate or control any electrically activated system of a railcar.

The pick-up shoe 10 includes a spring biased electrical contact 14 pivotally attached to a base plate 16 by a pivot pin 18. A spring 20 surrounds pivot pin 18 and includes ends engaging the contact 14 and the base plate 16. The spring 20 biases the contact 14 away from the base plate 16 and is used to maintain the contact 14 in engagement with the appropriate track-side actuator or contact in a conventional fashion.

Figure 2:
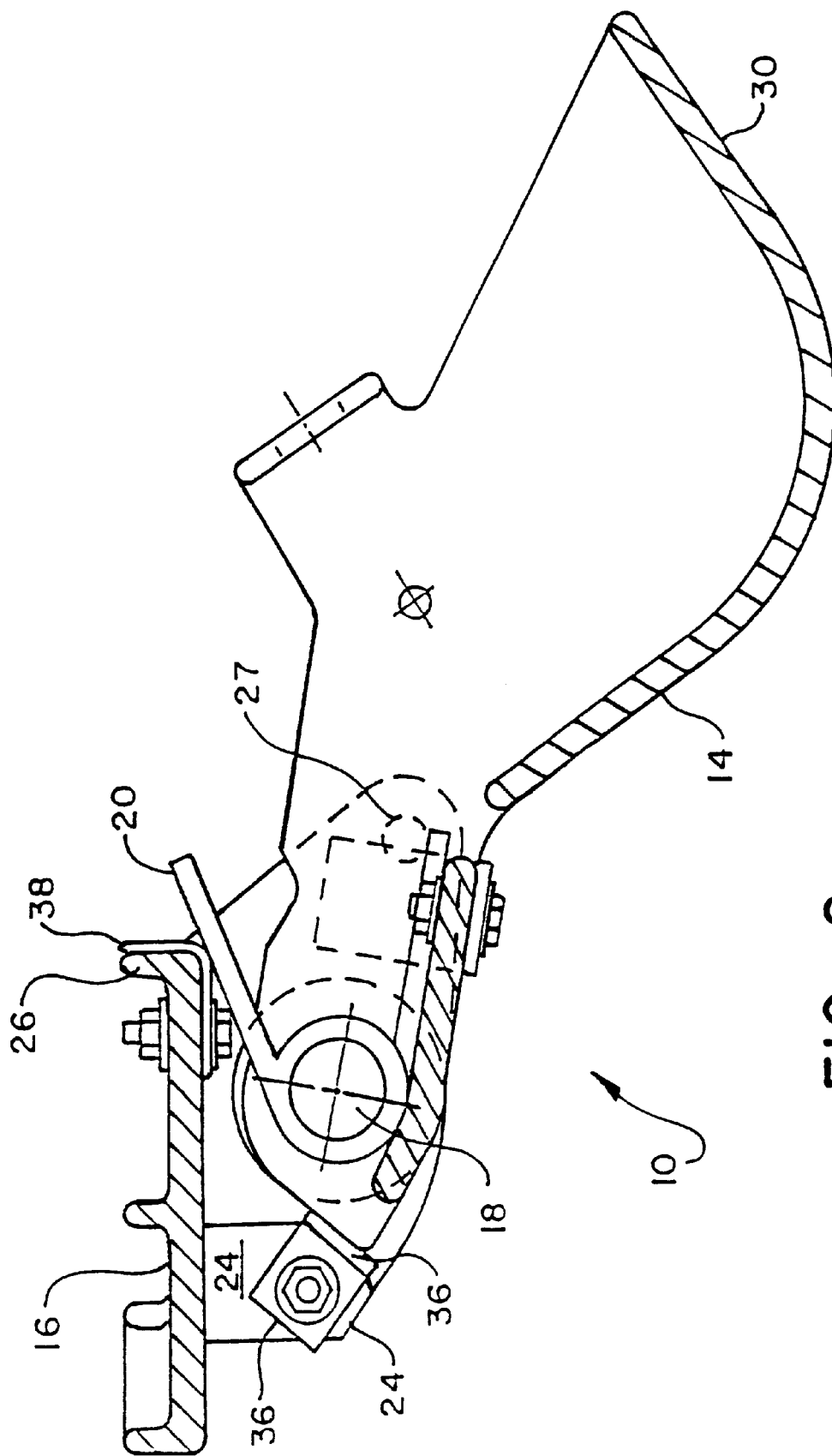
FIG. 2 is a cross-sectional view of the wayside electrical pick-up shoe illustrated in FIG. 1 with an electrical contact in an operative position.
Figure 3:
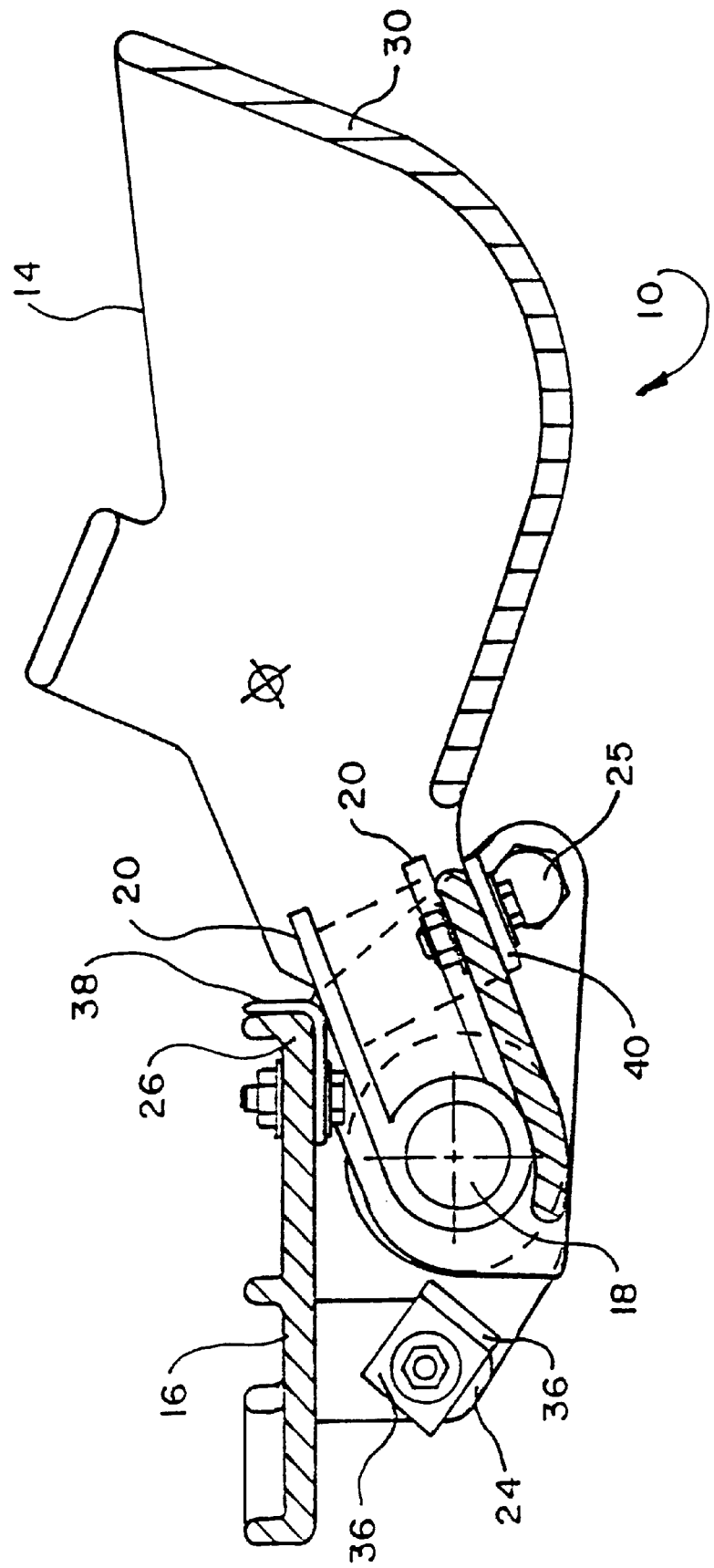
FIG. 3 is a cross-sectional view of the wayside electrical pick-up shoe illustrated in FIG. 1 with the electrical contact in a retracted, gagged position.
Figure 4:
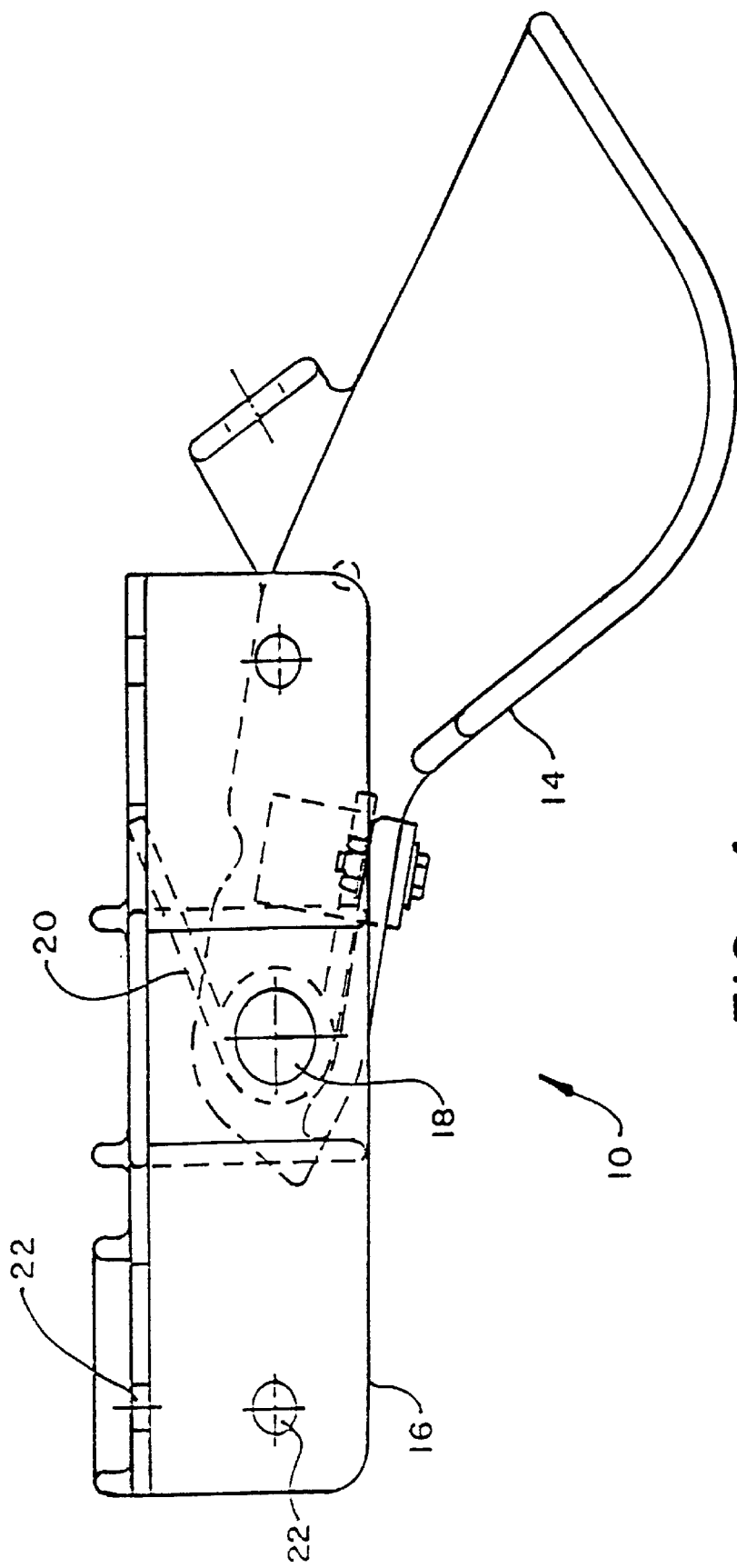
FIG. 4 is a top view of the wayside electrical pick-up shoe illustrated in FIG. 1.
Figure 5:
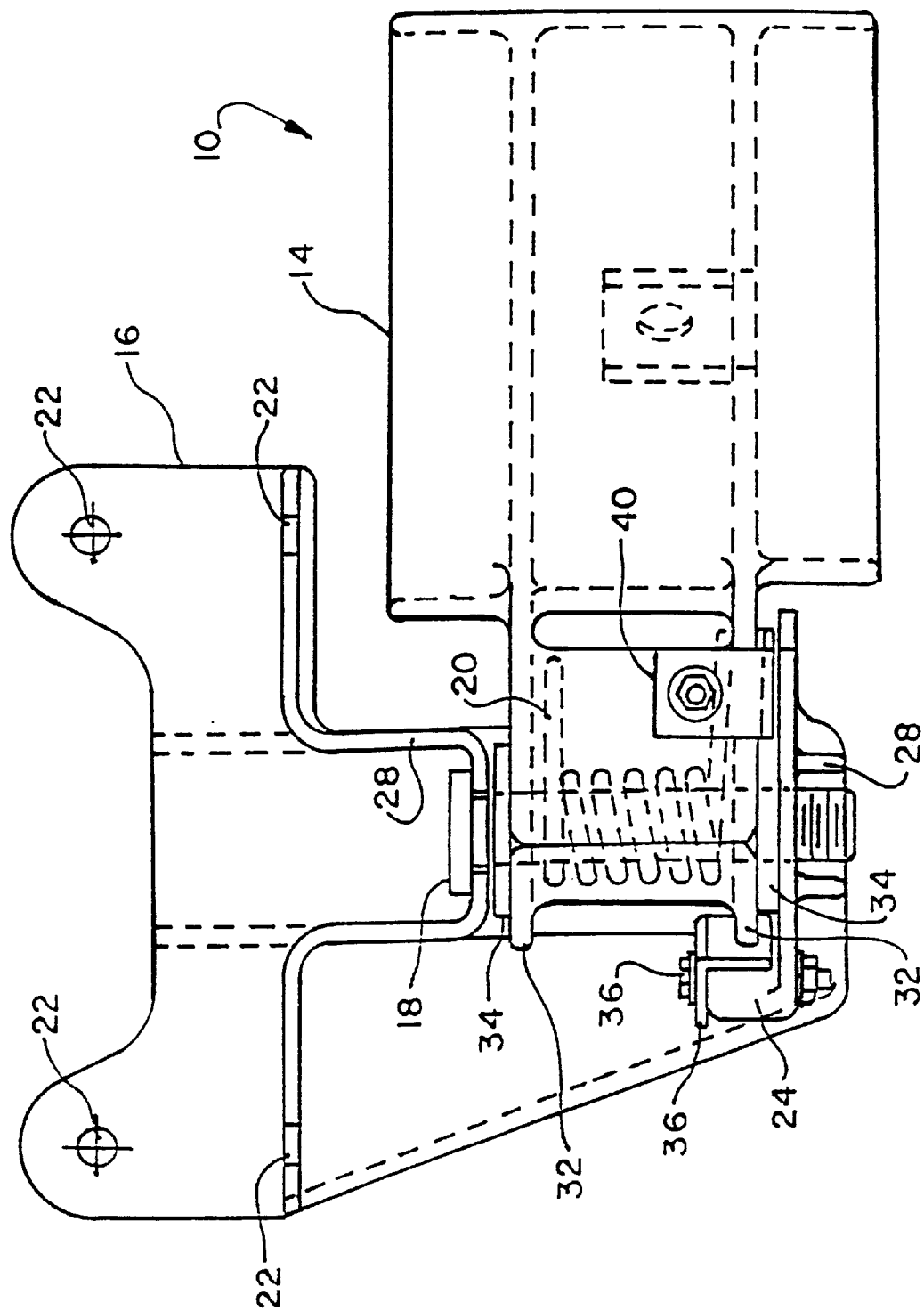
FIG. 5 is a front view of the wayside electrical pick-up shoe illustrated in FIG. 1.

The base plate 16 includes mounting holes 22 for attaching the pick-up shoe 10 to the railcar with conventionally sized connectors, such as bolts 23. The base plate 16 includes stops 24 and 26 for engaging the contact 14 in the extending operative position and the retracted inoperative or gagged positions, respectively, as illustrated in FIGS. 2 and 3. The retracted position of the contact 14 is illustrated in phantom in FIG. 3. A stopping bolt 25 is releasably positioned through hole 27 in base 16, as shown in FIG. 3, to maintain the contact 14 in the "gagged" position. The base plate 16 includes one pair of brackets or ribs 28 with pin receiving holes therein for mounting of the pivot pin 18.

The contact 14 includes a curved contact face 30 and a pin mounting bracket 32 for receiving the pivot pin 18. The contact 14 and the base plate 16 may be formed out of aluminum.

The pick-up shoe 10 is designed to electrically insulate the electrical contact 14 from the base plate 16. The mechanism for electrically insulating the contact 14 includes forming the pivot pin 18 of insulating material such as plastic, or the like. Insulating spacers 34 are provided between the ribs 28 of the base plate 16 and the bracket 32 of the contact 14. The spacers 34 may also be formed of plastic. Insulating plates 36 and 38, respectively, are attached to stops 24 or 26 of the contact 14. The insulating plates 34 and 36 may also be formed of plastic. Additionally, the first end of the spring 20 contacts insulating plate 38 to prevent the spring 20 from electrically connecting the contact 14 and the base plate 16. Alternatively, insulating material (not shown), such as rubber, could be supplied on at least the first end of the spring 20 which biases the contact 14. It may also be possible to form the spring 20 from an electrically insulating material. An insulating plate 40 is attached to the contact 14. The stopping bolt 25 abuts, the insulating plate 40 when in the "gagged" position. The insulating plate 40 prevents electrical connection between the contact 14 and the base plate 16 through the stopping bolt 25.

The wayside electrical pick-up shoe 10 operates in a conventional fashion and may be used for operating the discharge mechanism for the railcar or any other electrically activated railcar system. Additionally, the wayside electrical pick-up shoe 10, according to the present invention, allows the base plate 16 to be attached to the railcar by conventional connectors, such as bolts, because the present design avoids the need for electrical insulation between the base plate 16 and the railcar body 12. The pick-up shoe 10 incorporates the insulation into areas having less wear and stress than the prior art resulting in an increase in the expected life span of the pick-up shoe 10. The pick-up shoe 10 provides an easy gaging mechanism for maintaining the contact 14 in a retracted position.

One alternative modification of the present invention is to form at least part of the base plate out of insulating material. This construction would insulate the contact from the base plate through the insulating properties of the base plate itself. The material of the base plate must be sufficient to utilize conventional attachments, such as bolts.

Figure 6A:
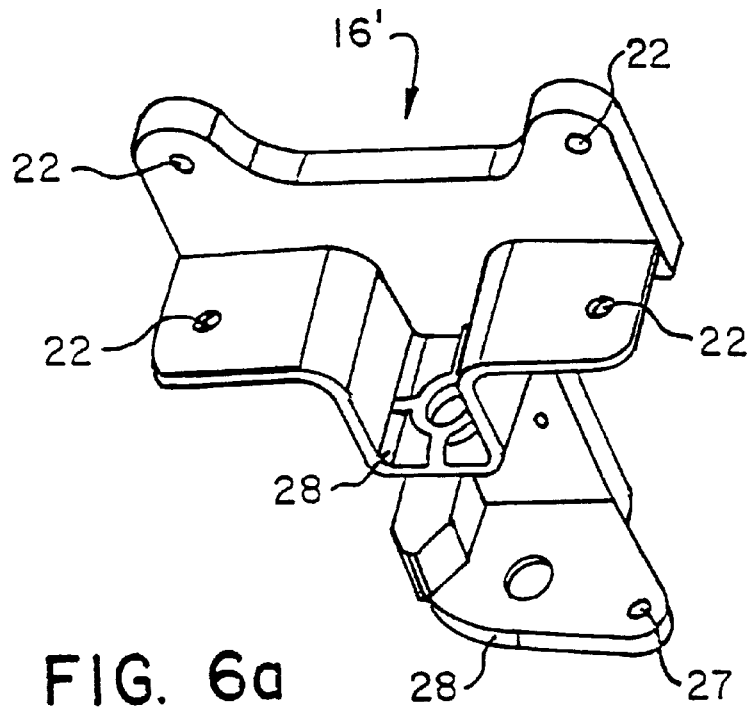
FIGS. 6a and 6b are perspective views of a base plate for a wayside electrical pick-up shoe according to a second embodiment of the present invention.
Figure 6B:
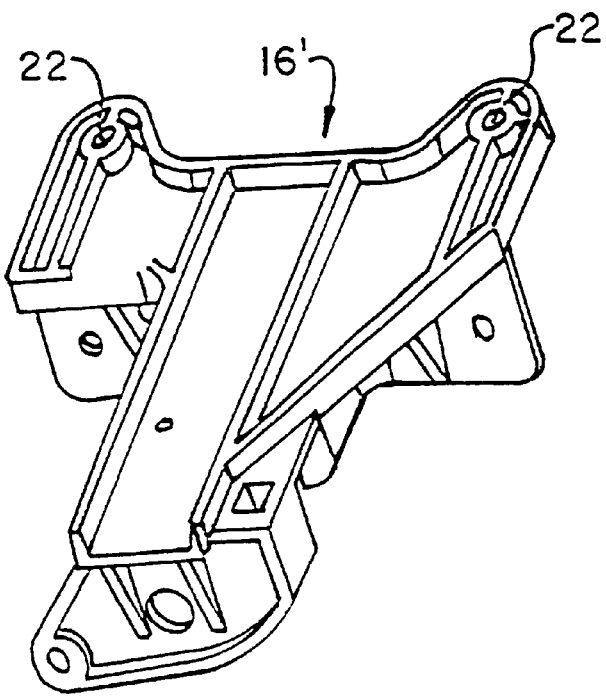
Figure 7A:
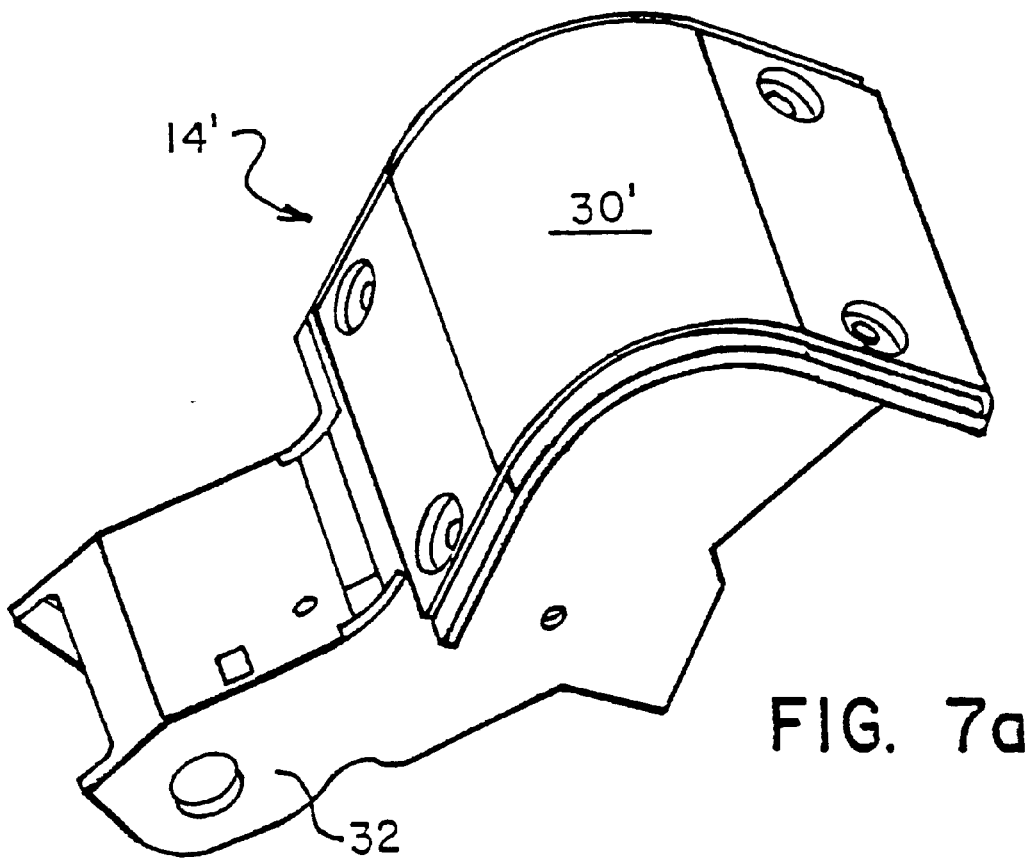
FIGS. 7a and 7b are perspective views of an electrical contact for the pick-up shoe according to the second embodiment of the present invention.
Figure 7B:
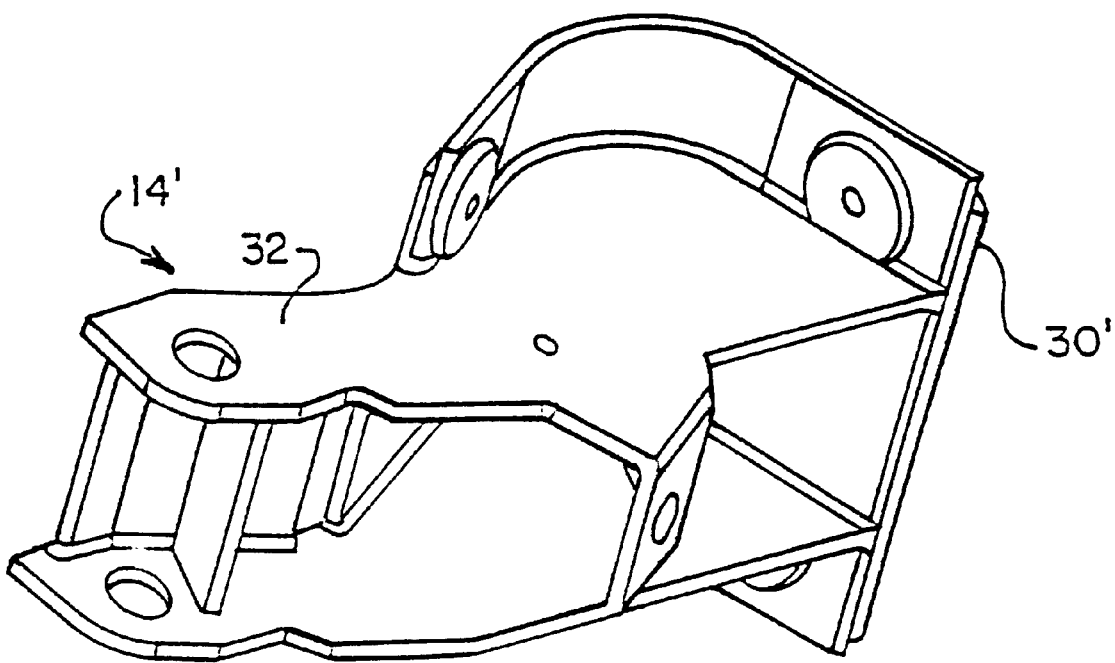

This modification of the present invention is shown in the modified pick-up shoe illustrated in FIGS. 6a, 6b, 7a and 7b. FIGS. 6a and 6b illustrate a one-piece molded base plate 16' for the modified pick-up shoe. The base plate 16' includes mounting holes 22 for attaching the modified pick-up shoe to the railcar in a manner similar to that discussed above in connection with pick-up shoe 10. Additionally, the base plate 16' includes stops for engaging a modified contact 14' (shown in FIGS. 7a and 7b) in the extended operative position and in the retractive inoperative position or "gaged" position, respectively, similar to the positions illustrated in FIGS. 2 and 3 above. The stopping bolt 25 can be releasably positioned through a hole 27 in the base 16' similar to the position shown in FIG. 3 to maintain the contact 14' in the "gaged" position. The base plate 16' includes one pair of brackets or ribs 28 with pin receiving holes therein for mounting of an appropriate pivot pin 18. The base plate 16' differs from base plate 16 of pick-up shoe 10 in that the base plate 16' is formed out of a non-conductive material, such as plastic or composite material. Specifically, the base plate 16' illustrated in FIGS. 6a and 6b is formed of xenoy having a wall thickness of about 0.25 inches. FIGS. 7a and 7b illustrate the electrical contact 14' for the modified pick-up shoe according to the second embodiment of the present invention. The contact 14' includes a separable curved electrical contact face plate 30' removably attached to a curved portion of the contact 14'. The contact 14' additionally includes a pin mounting bracket 32 for receiving a pivot pin 18 which is also received through holes in the brackets 28 of the base plate 16'. The contact 14' differs from contact 14 by providing a separable, replaceable contact face plate 30' which can be easily replaced as the contact surface wears out instead of replacing the entire contact 14. With this construction, the remaining portions of the contact 14' do not have to be formed out of an electrically conductive material and can be formed as a one-piece molded member. It should be understood that the modified pick-up shoe shown in part in FIGS. 6a, 6b, 7a and 7b operates in substantially the same manner as pick-up shoe 10. The modified pick-up shoe will utilize the same pivot pin 18 and spring 20 of the pick-up shoe 10. The modified pick-up shoe additionally provides for a lightweight pick-up shoe construction which is easier to maintain by providing a replaceable contact face plate 30'.

FIGS. 8–11 illustrate a further modified pick-up shoe 10" according to the present invention. The modified pick-up shoe 10" of FIGS. 8–11 is similar to the modified pick-up shoe of FIGS. 6a, 6b, 7a and 7b. The modified pick-up shoe 10" includes a molded base plate 16" made out of insulating material such as a polymer. This construction insulates the electrical contacting elements from the base plate 16" and the railcar body 12 through the insulating properties of the base plate 16" itself. The material of the base plate 16" must be sufficient to utilize conventional attachments, such as bolts. FIGS. 8 and 9 illustrate the one-piece molded base plate 16" for the modified pick-up shoe 10". The base plate 16" includes mounting holes 22 for attaching the modified pick-up shoe 10" to the railcar body 12 in a manner similar to that discussed above in connection with the pick-up shoe 10. The base plate 16" includes one pair of brackets or ribs 28 with pin receiving holes therein for mounting of an appropriate pivot pin 18. The base plate 16" differs from base plate 16 of the pick-up shoe 10 in that the base plate 16" is formed out of a non-conductive material, such as plastic or composite material. FIGS. 8, 10 and 11 illustrate the electrical contact 14" for the modified pick-up shoe 10" according to the third embodiment of the present invention. The contact 14" includes a separable electrical contact face plate 30" removably attached to a curved portion of the contact 14". The contact 14" additionally includes a pin mounting bracket 32 for receiving a pivot pin 18 which is also received through holes in the brackets 28 of the base plate 16". The contact 14" is similar to contact 14' and differs from contact 14 by providing a separable, replaceable contact face plate 30" which can be easily replaced as the contact surface wears out instead of replacing the entire contact 14. With this construction, the remaining portions of the contact 14" do not have to be formed out of an electrically conductive material and can be formed as a one-piece molded member 15, as shown in FIG. 10. It should be understood that the modified pick-up shoe 10", shown in FIGS. 8–11 operates in substantially the same manner as pick-up shoe 10. The modified pick-up shoe 10" will utilize the same pivot pin 18 and spring 20 of the pick-up shoe 10. The modified pick-up shoe 10" also provides for a lightweight pick-up shoe construction which is easier to maintain by providing a replaceable contact face plate 30".

The above description illustrates that the wayside electrical pick-up shoe of the present invention offers significant advantages over the prior art pick-up shoes without detrimental drawbacks. It will be apparent to those of ordinary skill in the art that various changes may be made to the present invention without departing from the spirit and scope thereof.

We claim:

1. A wayside electrical pick-up shoe for a railcar, said pick-up shoe comprising:
   a base plate adapted to be attached to the railcar;
   an electrical contact pivotally attached to said base plate; and
   an electrical insulation means for insulating said base plate from said electrical contact, wherein said electrical insulation means includes an electrically insulating material forming at least part of said base plate.

2. The pick-up shoe of claim 1 further including a spring biasing said electrical contact into an engagement position.

3. The pick-up shoe of claim 1 wherein said electrical contact includes a replaceable electric contact plate.

4. The pick-up shoe of claim 1 wherein said base plate is a one-piece molded member.

5. The pick-up shoe of claim 4 wherein said electrical contact includes a molded portion and a separable electrical contact plate.

6. A wayside electrical pick-up shoe for a railcar, said pick-up shoe comprising:
   a base plate adapted to be attached to a railcar;
   an electrical contact pivotally attached to said base plate; and
   an electrical insulation means for insulating said base plate from said electrical contact, wherein said electrical insulation means includes a pivot pin pivotally attaching said electrical contact with said base plate, wherein said pivot pin is formed of electrically insulating material.

7. The pick-up shoe of claim 6 wherein said base includes an aperture adapted to receive a holding member for holding said electrical contact in a retracted position.

8. A wayside electrical pick-up shoe for a railcar, said pick-up shoe comprising:
   a base plate adapted to be attached to the railcar, wherein said base plate is formed as a one-piece molded member of insulating material; and
   an electrical contact pivotally attached to said base plate.

9. The pick-up shoe of claim 8 wherein said electrical contact includes a molded portion and a separable electrical contact plate.

10. The pick-up shoe of claim 8 further including a pivot pin pivotally attaching said electrical contact with said base plate.

11. The pick-up shoe of claim 10 further including a spring biasing said electrical contact into an engaged position.

12. The pick-up shoe of claim 8 wherein said base includes an aperture adapted to receive a holding member for holding said electrical contact in a retracted position.

13. A railcar comprising:
   a) a railcar body;
   b) at least one electrically activated railcar system on said body; and
   c) a wayside electrical pick-up shoe attached to said railcar body and electrically coupled to said at least one electrically activated railcar system, said electrical pick-up shoe adapted to engage an electrical actuator external of said railcar, said electrical pick-up shoe electrically insulated from said railcar body, said pick-up shoe including:
      i) a base plate adapted to be attached to said railcar body;
      ii) an electrical contact pivotally attached to said base plate; and
      iii) an electrical insulation means for insulating said base plate from said electrical contact, wherein said electrical insulation means includes an electrically insulating material forming at least part of said base plate.

14. A railcar comprising:
   a) a railcar body;
   b) at least one electrically activated railcar system on said body; and
   c) a wayside electrical pick-up shoe attached to said railcar body and electrically coupled to said at least one electrically activated railcar system, said electrical pick-up shoe adapted to engage an electrical actuator external of said railcar, said electrical pick-up shoe electrically insulated from said railcar body, said pick-up shoe including:
      i) a base plate adapted to be attached to said railcar body;
      ii) an electrical contact pivotally attached to said base plate; and iii) an electrical insulation means for insulating said base plate from said electrical contact, wherein said electrical insulation means includes a pivot pin pivotally attaching said electrical contact with said base plate, wherein said pivot pin is formed of electrically insulating material.

15. The railcar of claim 14 wherein said base plate includes an aperture adapted to receive a holding member for holding said electrical contact in a retracted position.

16. The railcar of claim 13 wherein said electrical contact includes a replaceable electric contact plate.

17. The railcar of claim 13 wherein said base plate is a one-piece molded member of insulating material.

18. The railcar of claim 13 wherein said electrical contact includes a molded portion and a separable electrical contact plate.

* * * * *